US010113773B2

(12) United States Patent
Ledwon

(10) Patent No.: US 10,113,773 B2
(45) Date of Patent: Oct. 30, 2018

(54) GEOTHERMAL PROBE WITH MIXING ELEMENTS

(71) Applicant: DYNAMIC BLUE HOLDING GMBH, Gräfelfing (DE)

(72) Inventor: Anton Ledwon, Troisdorf (DE)

(73) Assignee: DYNAMIC BLUE HOLDING GMBH, Gräfelfing (DE)

(*) Notice: Subject to any disclaimer, the term of this patent is extended or adjusted under 35 U.S.C. 154(b) by 41 days.

(21) Appl. No.: 14/911,108

(22) PCT Filed: Sep. 23, 2014

(86) PCT No.: PCT/EP2014/070261
§ 371 (c)(1),
(2) Date: Feb. 9, 2016

(87) PCT Pub. No.: WO2015/044142
PCT Pub. Date: Apr. 2, 2015

(65) Prior Publication Data
US 2016/0195304 A1  Jul. 7, 2016

(30) Foreign Application Priority Data
Sep. 24, 2013  (DE) .................. 10 2013 110 573

(51) Int. Cl.
*F25D 27/00*  (2006.01)
*F24T 10/17*  (2018.01)
(Continued)

(52) U.S. Cl.
CPC .............. *F24T 10/17* (2018.05); *F24T 10/00* (2018.05); *F25B 30/00* (2013.01); *Y02E 10/125* (2013.01)

(58) Field of Classification Search
CPC .. F24J 3/084; F24J 3/08; Y02E 10/125; F24F 313/12; F25B 30/00
See application file for complete search history.

(56) References Cited

U.S. PATENT DOCUMENTS

2007/0023163 A1* 2/2007 Kidwell .................. F24J 3/084
165/45

FOREIGN PATENT DOCUMENTS

EP  2034252 A2 *  3/2009  ............... F24J 3/084
EP  2151643 A2    2/2010
(Continued)

OTHER PUBLICATIONS

EP 2034252 A2 Translation.*
(Continued)

*Primary Examiner* — Elizabeth Martin
(74) *Attorney, Agent, or Firm* — Cantor Colburn LLP

(57) ABSTRACT

A geothermal probe for exchanging heat between ground surrounding the geothermal probe, in which the geothermal probe is arranged in the operating state, and a heat transfer fluid includes inflow and outflow pipes. The inflow pipe has an inflow pipe inner surface and the outflow pipe, arranged therein, has an outflow pipe outer surface. Between the inflow pipe inner surface and the outflow pipe outer surface and annular space is formed that is entered by the heat transfer fluid in laminar flow. At least two mixing elements are arranged at a distance from one another in the annular space. The mixing elements bring about a repeated alternation between laminar flow of the heat transfer fluid and mixing.

9 Claims, 3 Drawing Sheets

(51) Int. Cl.
    *F24T 10/00*   (2018.01)
    *F25B 30/00*   (2006.01)

(56)      References Cited

FOREIGN PATENT DOCUMENTS

| EP | 2360438 A2 * | 2/2011 | ............... F24J 3/084 |
| EP | 2360438 A2 | 8/2011 | |
| JP | 10309451 A | 11/1998 | |
| JP | 200434063 A | 12/2004 | |
| JP | 2007321383 A | 12/2007 | |

OTHER PUBLICATIONS

EP 2360438 A2 Translation.*
International Search Report dated Nov. 27, 2014 re: Application No. PCT/EP2014/070261; pp. 1-3; citing: EP 2 360 438 A2, EP 2 034 252 A2, EP 2 151 643 A2, JP 2007 321383 A, JP 2004 340463 A and JP H10 309451 A.

* cited by examiner

GEOTHERMAL PROBE WITH MIXING ELEMENTS

TECHNICAL FIELD

The disclosure relates to a geothermal probe, partly also called earth probe, which is provided for exchanging heat between a heat transfer fluid and the ground surrounding the geothermal probe, in which the geothermal probe is arranged in the operating state. Here, the disclosure relates to a large-volume coaxial geothermal probe with an outlet pipe arranged in an inlet pipe.

BACKGROUND

Geothermal probes can be constructed coaxially or U-shaped. U-shaped geothermal probes comprise an inlet pipe which leads down into the ground and at a lower end is connected in a connecting region to an outlet pipe in a fluid-conducting manner. The heat transfer fluid, also called heat transfer liquid, thus flows down the inlet pipe, merges in the connecting region into the outlet pipe and flows up again in the same. In coaxial geothermal probes, the inlet pipe is a probe outer pipe and the outlet pipe is a probe inner pipe arranged within the probe outer pipe. Outside the probe inner pipe and within the probe outer pipe there is an annular space, also called heat transfer space, which forms a heat transfer region. The arrangement of the probe outer pipe with respect to the probe inner pipe in this case is coaxial. The connecting region with a coaxial geothermal probe is formed by an opening of the probe inner pipe so that the heat transfer fluid that is located in the probe outer pipe or in the annular space in this case can flow into the probe inner pipe.

On passing through the geothermal probe, a heat transfer between the heat transfer fluid and the ground takes place. The heat transfer substantially takes place by convection. Where the heat is emitted or absorbed depends on whether the geothermal probe is used for a cold process or a heat process. To this end, generic geothermal probes are arranged up to 100 meter deep in the ground, in individual cases even greater depths are realised.

The heat transfer fluid is conducted into the geothermal probe at an inlet.

When at the inlet heat transfer fluid is introduced into the geothermal probe the heat transfer fluid as a rule is forced by pressurisation to pass through the entire length of a geothermal probe twice, once in inlet direction down the inlet pipe and once against the inlet direction up the outlet pipe. The quantity of heat transfer fluid conducted through the geothermal probe per time is called volumetric flow rate. In the lower end of the geothermal probe the heat transfer fluid is again directed upwards through the probe inner part/outlet pipe and can be removed at a drain. The probe inner pipe can also be connected to the inlet and the probe outer pipe also to the drain.

The temperature difference between the heat transfer fluid flowing into and flowing out of the geothermal probe is called temperature gradient in the following. A heat flow or a heat output, heat in brief, is extracted from the ground as heat reservoir.

In the case of geothermal probes of less than 100 m length or depth, the temperature gradient between the introduced heat transfer fluid and the discharged heat transfer fluid generally amounts to a few degrees. Introduction values between −2° C. and 1° C. and discharge values between 2° C. and 5° C. are usual. The temperature gradient is relatively low and the temperature of the heat transfer fluid exiting from the geothermal probes does not yet correspond to a heat requirement as demanded for example for heating residential rooms. The heat output however can be rendered utilisable with the help of a heat pump, wherein the efficiency of a heat pump indicates how effectively a heat output supplied by the heat transfer fluid is converted into a heat requirement for heating. In a heat pump, a supplied heat output is utilised at a low temperature level in order to evaporate a heat medium which is located in a second fluid circuit, in an evaporator. In this case, the evaporator is a component in which the heat extracted from the geothermal probes is fed to the heat pump at a low temperature level. To this end, the heat transfer liquid discharged from the geothermal probes flows through the heat exchanger, passing its heat onto the second fluid circuit. Following this, the heat medium is supplied to a pump, which compresses the now gaseous heat medium, thus bringing it to a higher pressure level. In the process, the gaseous heat medium heats up and this heat that can be utilised for heating a residential room. On passing on its heat to the residential room, the heat medium cools down and condenses. In a choke, the pressure is again expanded to the lower pressure level. It is now again supplied to the evaporator of the heat pump and a heat pump circuit is thus provided. However, there are still other types of heat pumps which do not function as described above. These are well known to the person skilled in the art. The heat transfer fluid in the geothermal probes can be omitted when the heat medium itself circulates through the geothermal probes. The disclosure is not limited to geothermal heat circuits with two separate circuits.

Usually, multiple geothermal probes are employed in a geothermal probe heat circuit since the utilisable temperature difference of a geothermal probe is not usually adequate in order to evaporate the heat medium in the second fluid circuit. Although geothermal probes are well suited for absorbing heat from the ground in order to be incorporated in the process of a heat pump, there is nevertheless the desire to increase the temperature gradient that can be achieved by the discharge value of the heat transfer fluid that can be achieved with popular geothermal probes. Generally it can be said that a higher discharge value of the heat transfer fluid results in an improved efficiency since the heat pump then has to handle a lower temperature difference between discharge value, i.e. the temperature of the heat transfer fluid and the heat requirement.

The temperature of the ground in Germany for example from a depth of 15 meter is constantly approximately 10° C. throughout the year and it increases by approximately 120 C. for every further 30 meters. In particular in the case of geothermal probes with a length of under 70 m, the discharge value that can be achieved is frequently inadequate since the heat exchange does not take place effectively enough. It is additionally advantageous when the heat transfer fluid can hold a temperature once reached for as long as possible without loss, in particular when multiple geothermal probes are connected in series. Especially large-volume geothermal probes are suitable for this. In the case of a larger meter volume, a larger quantity of heat is necessary in order to achieve a higher temperature. However, once it has reached a temperature it offers the advantage of longer temperature stability for the same reason.

Large-volume geothermal probes are characterized in that an inner diameter of the inlet pipe limited by an inlet pipe inner surface and an outer diameter of the outlet pipe limited by the outlet pipe outer surface are selected so that in the annular space a meter volume >10 l is obtained and the heat transfer fluid without further ado is a substantially laminar flow within the annular space. Whether a flow is laminar depends on the geometry of the flow path, the viscosity of the heat transfer fluid and on the flow velocity. The so-called Reynolds number which is a dimension regarding the point at which turbulences occur in a flow is obtained from this. It is generally true that the higher the flow velocity the sooner is the critical Reynolds number exceeded. A low flow velocity ensures an (approximately) laminar flow. In addition, the heat transfer fluid through the low flow velocity has more time of absorbing the heat on the inlet pipe inner surface. A laminar flow however can be considered a disadvantage since within an (approximately) laminar flow layers of uneven temperature are formed. The layers of uneven temperatures run vertically and thus parallel to the inlet pipe inner surface, wherein near the inlet pipe inner surface warmer layers are present, which act as insulators of the inner layers.

SUMMARY

The disclosure improves the heat exchange between the heat transfer fluid and the heat reservoir in geothermal probes and thus the efficiency of geothermal probe heat circuits. In addition, the disclosure provides an effective use of geothermal probes in regions in which laws limit the permissible drilling depth.

A geothermal probe according to the disclosure is surrounded by ground in the operating state and serves for the exchange of heat between the ground and a heat transfer fluid located within the geothermal probe. The geothermal probe comprises an inlet pipe, via which the heat transfer fluid is introduced into the geothermal probe and thus into the ground and an outlet pipe, through which the heat transfer fluid is discharged again. Usually, the heat transfer fluid is introduced into the inlet pipe via an inlet and the direction of the inlet in the direction of the earth interior is called inlet direction (flow direction). According to the disclosure, the outlet pipe is arranged within the inlet pipe, so that between an inlet pipe inner surface and an outlet pipe outer surface an annular space forms, into which the heat transfer fluid flows. The heat exchange in a geothermal probe according to the disclosure takes place in the inlet pipe. The disclosure relates to large-volume geothermal probes in the case of which the diameter defined by the inlet pipe inner surface is of such a size that a laminar flow is generally present. The outer diameter of the outlet pipe defined by the outlet pipe outer surface is selected so that generally a meter volume of more than 8 l is obtained in the annular space. Preferably, the diameter that is defined by the inlet pipe inner surface is greater than 120 mm and the meter volume of the annular space is greater than 12 l.

It has transpired that especially a repetitive change of an almost laminar flow and the mixing of the heat transfer fluid cause an effective heat exchange. In a geothermal probe according to the disclosure, the heat transfer fluid flows into the inlet pipe in a laminar manner. The geothermal probe furthermore comprises at least two mixing elements, which are arranged spaced from one another within the annular space along a longitudinal axis of the outlet pipe. The distance between the mixing elements in this case is selected so that the heat transfer fluid, having passed a mixing element, calms again and a laminar flow is again obtained before it strikes the next mixing element. Typically, the distance between the mixing elements is 1 to 2.5 m, preferably between 1.5 m and 2 m, wherein it must be noted that these values should be considered order of magnitude and for determining the ideal distances the flow velocity, the inner diameter of the inlet pipe, the outer diameter of the outlet pipe and the viscosity of the heat transfer fluid have to be taken into account. It is noted at this point that in practice there is no flow that is purely laminar, i.e. without turbulences, which is why in the following the term almost laminar flow or substantially laminar flow is used. For the substantial aspect of the disclosure it is not necessary either that the flow between the mixing elements steadies again completely, it being sufficient that it steadies and again becomes almost laminar.

A mixing element comprises at least two part ring discs with an outer edge, an inner edge and two free ends each, which delimit a part ring surface. The part ring discs can be connected to the outlet pipe in any way, for example welded or bonded. Accordingly, the components of the mixing element can be made of the same material as the outlet pipe, preferentially of thermoplastic, as a result of which easy connecting of the part ring discs with the outlet pipe is ensured. In an advantageous configuration, the mixing elements can be variably arranged in the annular space in order to be able to match the distances of the mixing elements to the respective special task of the geothermal probe. If for example the heat transfer fluid of geothermal probes differs, the ideal distance of the mixing elements can also differ. The mixing element can for example comprise a sleeve, via which the part ring discs are arranged on the outlet pipe outer surface. Bores with internal thread for example which are formed along the longitudinal axis of the outlet pipe in the outlet pipe outer surface then serve for locking the sleeve. A grub screw can then be employed for fixing the mixing element. Once the distances of the mixing elements have been established, these can also be welded to the outlet pipe.

According to the disclosure, the outer edge of a part ring disc is spaced from the inlet pipe inner surface and with the same forms an annular gap, through which a part of the heat transfer fluid can flow. Typically, this annular gap amounts to 1-12 mm, in particular 4-8 mm.

One each of the free ends of a part ring disc is arranged spaced from one of the free ends of an adjacent part ring disc. In addition, adjacent part ring discs are arranged differently obliquely to an orthogonal plane of the longitudinal axis of the outlet pipe. Substantially spaced means that between one of the free ends of two adjacent part ring discs an opening each is formed, through which a flow path with a vertical component leads along the longitudinal axis of the outlet pipe. Depending on configuration and arrangement of the part ring discs, a component of the flow path with a vertical component that is different in magnitude leads directly along the outlet pipe outer surface. For example, the part ring surfaces are configured as half ring surfaces, so that in each case the free ends of a part ring disc include an angle of 180° with one another. However, other variants of a circle segment portion are also conceivable. If the angle that is included by the free ends of a part ring disc is less than 180°, the component of the flow path with a vertical component which leads directly along the outlet pipe outer surface increases.

The obliquely standing part ring discs bring about a further flow path with a rotatory component over the part ring surfaces and about the outlet pipe. In a top view, in the flow direction to the mixing element, the heat transfer fluid, depending on arrangement of the part ring discs, flows about the outlet pipe in clockwise or anti-clockwise direction. Preferably, the part ring discs of the different mixing elements are each arranged so that the direction of the rotatory component of the flow of adjacent mixing elements differs.

The flow paths described above intersect one another and bring about intermixing, also called swirling of the heat transfer fluid. This intermixing is additionally favored by a swirl imparted on the heat transfer fluid through the rotatory movement. Altogether, the flow in this region can also be described as turbulent or turbulent, wherein this designation is to merely serve to illustrate that the layers of different heat of the heat transfer fluid intensively intermix in this region.

Through the advantageous configuration, the intermixing is caused especially in the region of the inlet pipe inner surface and in the region of the outlet pipe outer surface, i.e. exactly in the regions which in the laminar flow constitute the layers with the greatest temperature difference. In the case of the large-volume geothermal probes preferred here, there is the risk in the case of purely laminar flow that the inner layers hardly absorb any heat. For this reason, this layer formation is cancelled out through the intermixing of the heat transfer fluid.

The boundary layer between the flows is broken open. Through this breaking-open and the resultant intermixing an altogether effective heat exchange between the ground and the heat transfer fluid takes place. Through the special arrangement of the mixing elements the necessary length of a geothermal probe, which is required so that the geothermal probe reaches an adequately high temperature gradient or discharge value, can be reduced. The geothermal probe can thus be employed also in regions in which the drilling depth is geologically or legally limited. The efficient heat exchange is achieved through the change between fast laminar flow and intermixing of the heat transfer fluid. In particular, the geothermal probes according to the disclosure are also suitable for cooling because of their efficient heat exchange with the ground.

A further aspect of the disclosure relates to a geothermal probe heat circuit 100 as seen in FIG. 4 a circulating pump 140 at relatively short time intervals, delivers or moves the heat transfer fluid into a connection heat circuit 110 with at least one geothermal probe 112 even when there is no heat request from a heat pump 122 following a consumer circuit 120. In contrast with conventional devices, in the case of which the circulating pump delivers only in particular when there is a heat request from the consumer or from the heat pump, the circulating pump according to the disclosure operates independently thereof. Because of this it is achieved that a circulation and thus an intermixing of the heat transfer fluid within the geothermal probes 112 takes place even in the stationary state of the consumer heat circuit 120. This in turn leads to an increased heating of the heat transfer fluid 142, which significantly increases the efficiency of the heat pump 122. Thus, the heat transfer fluid 142 is already preheated within the geothermal probe 112 even when it is not required, before it reaches the heat pump 122. In particular, the time that is needed until the heat pump 122 makes available a heat request is also reduced because of this.

A method according to the disclosure for operating such a geothermal probe heat circuit is characterized in that the heat transfer fluid circulates through the circulating pump at short time intervals within the geothermal probe or, depending on configuration, within the geothermal probes so that intermixing of the heat transfer fluid is always generated.

BRIEF DESCRIPTION OF THE DRAWINGS

Further features and advantages of the disclosure are obtained from the following description of an exemplary embodiment which is not to be understood as being restrictive, which is explained in more detail in the following making reference to the figures. In the drawings.

DETAILED DESCRIPTION OF THE DRAWINGS

Figure 1:
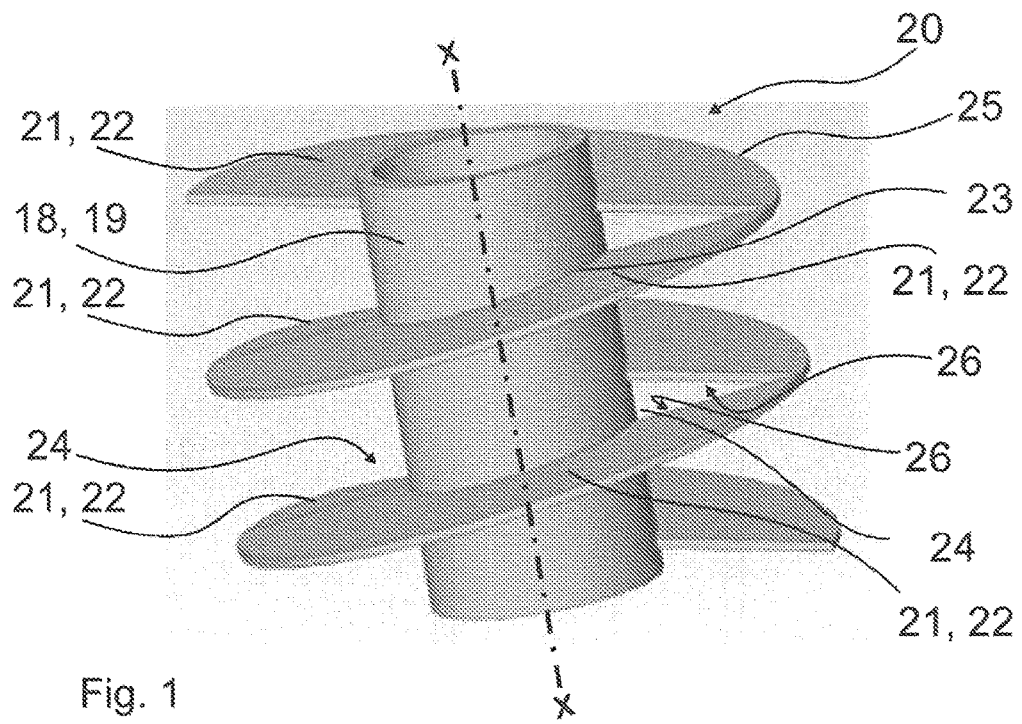
FIG. 1: a perspective representation of a mixing element on an outlet pipe.

FIG. 1 schematically shows a section of an outlet pipe 18 on which a mixing element 20 is arranged. In the shown exemplary embodiment, the same comprises five part ring discs 22 with a part ring surface 21 each, which is delimited by an outer edge 25, an inner edge 23 and two free ends 26 each.

The part ring discs 22 are arranged differently obliquely to an orthogonal plane of a longitudinal axis x-x of the outlet pipe 18, wherein in each case one of the free ends 26 is arranged spaced from one of the free ends 26 of the adjacent part ring disc 22. Because of this, the two free ends 26 of adjacent part ring discs 22 form an opening 24, which extends in a vertical direction along the longitudinal axis x-x of the outlet pipe 18. The free ends 26 of adjacent part ring disc 22 are substantially arranged spaced from one another and here contact one another only in the region of their outer edge 25. Through the oblique arrangement of the part ring discs 22, the appearance of the mixing element 20 resembles that of a helix winding about the outlet pipe 18 in clockwise direction in a top view in the direction of the longitudinal axis x-x.

Figure 2:
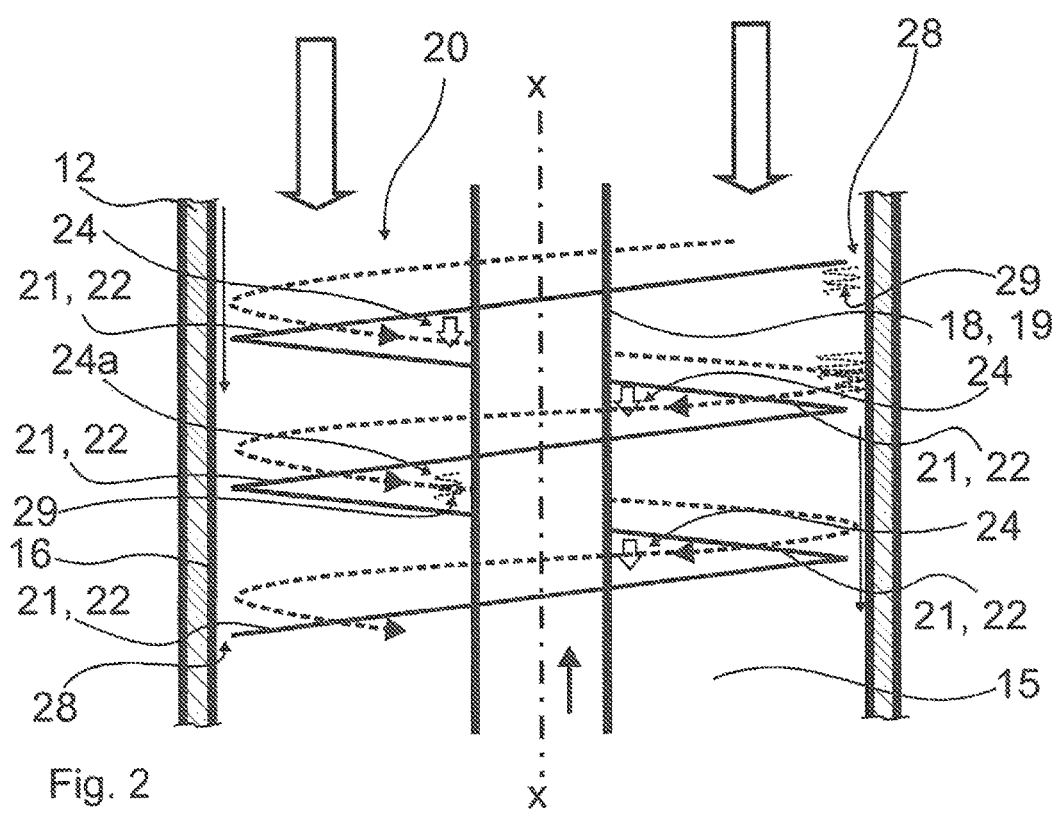
FIG. 2: a cross section through an inlet pipe in a region in which a mixing element is arranged.

FIG. 2 shows a simplified cross section through an inlet pipe 12 of a geothermal probe 10 according to the disclosure in a region in which a mixing element 20 is arranged in the annular space 15 between an inlet pipe inner surface 16 and an outlet pipe outer surface 19. The mixing element 20 shown in FIG. 2 corresponds to the mixing element 20 illustrated in FIG. 1 in a schematic representation. In the cross section it is noticeable that between the outer edges 25 of the part ring discs 22 and the inlet pipe inner surface 16 an annular gap 28 is formed.

In the region of the annular space 15, in which the mixing element 20 is arranged, the heat transfer fluid substantially flows along three different flow paths. Before this, the heat transfer fluid flows towards the mixing element 20 in the annular space 15 in an (approximately) laminar manner. The direction of the heat transfer fluid flowing in a laminar manner is shown by large open arrows. The direction of the arrows corresponds to the inlet direction of the heat transfer fluid.

When the laminar-flow heat transfer fluid in inlet direction strikes the part ring surface 21 of the first part ring disc 22, it is directed over the further part ring surfaces 21 in a rotatory movement about the outlet pipe 18 in clockwise direction. This first flow path is shown as a dashed spiral with arrows about the outlet pipe 18.

Through the openings 24 already shown in FIG. 1 between two part discs 22 a second flow path with a vertical component is obtained, wherein a part leads directly along the outlet pipe outer surface 19. This second flow path in each case is shown by a small open arrow in the opening 24. For the sake of clarity, the representation of the small open arrow was omitted in one of the openings 24a, instead of this a small turbulence 29 is shown, which signifies the intermixing of the heat transfer fluid at this point.

The annular gap 28 between the outer edges 25 of the part circular discs 22 and the inlet pipe inner surface 16 constitutes a third flow path. This is indicated by narrow long arrows. In this region, too, the intermixing of the heat transfer fluid is partly shown by small turbulences 29.

In a connecting region in the lower end of the inlet pipe 12 which is not shown here, the heat transfer fluid flows into the outlet pipe 18. The flow direction within the outlet pipe 18 is shown by a black arrow. It is directed opposite to the inlet direction.

Figure 3:
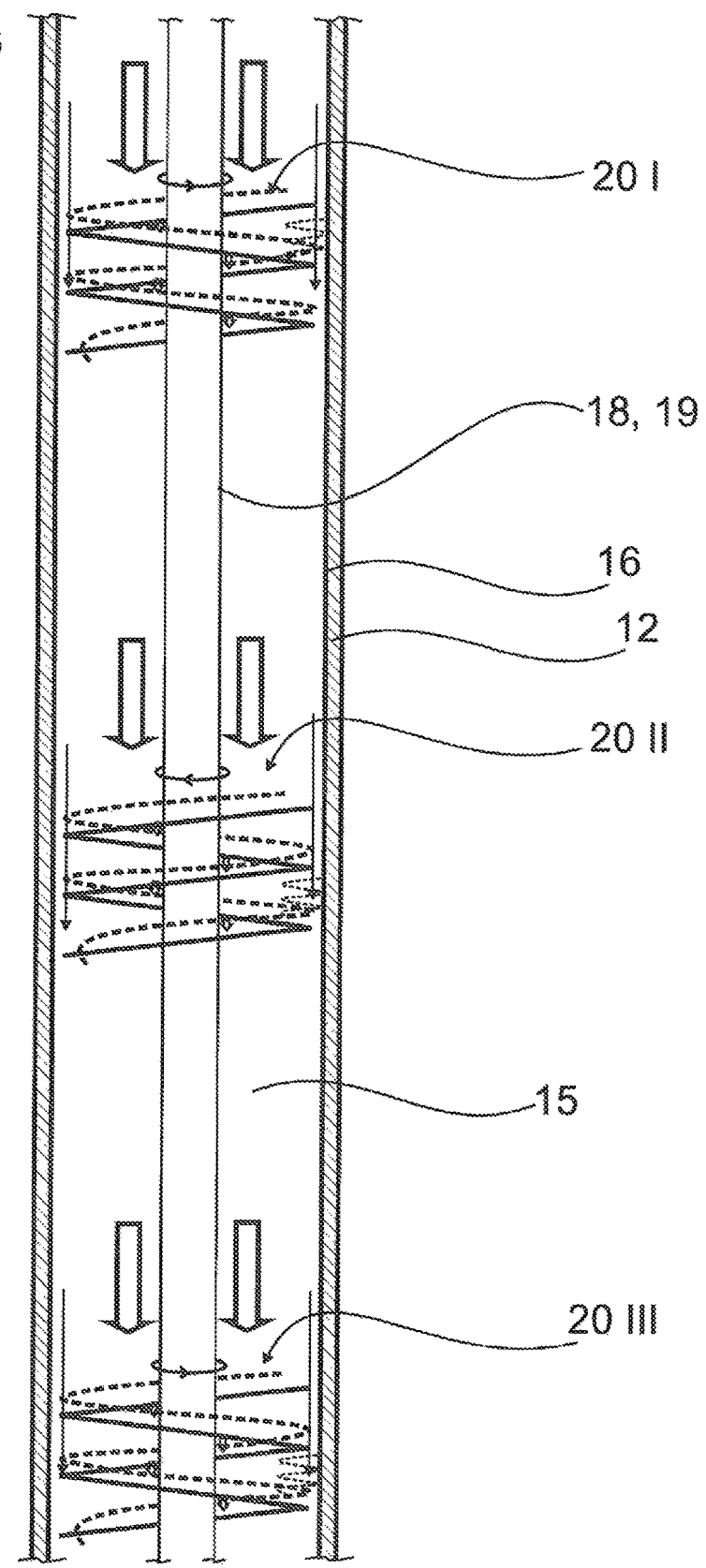
FIG. 3: a cross section through an inlet pipe, in a region, in which three mixing elements are arranged.
Figure 4:
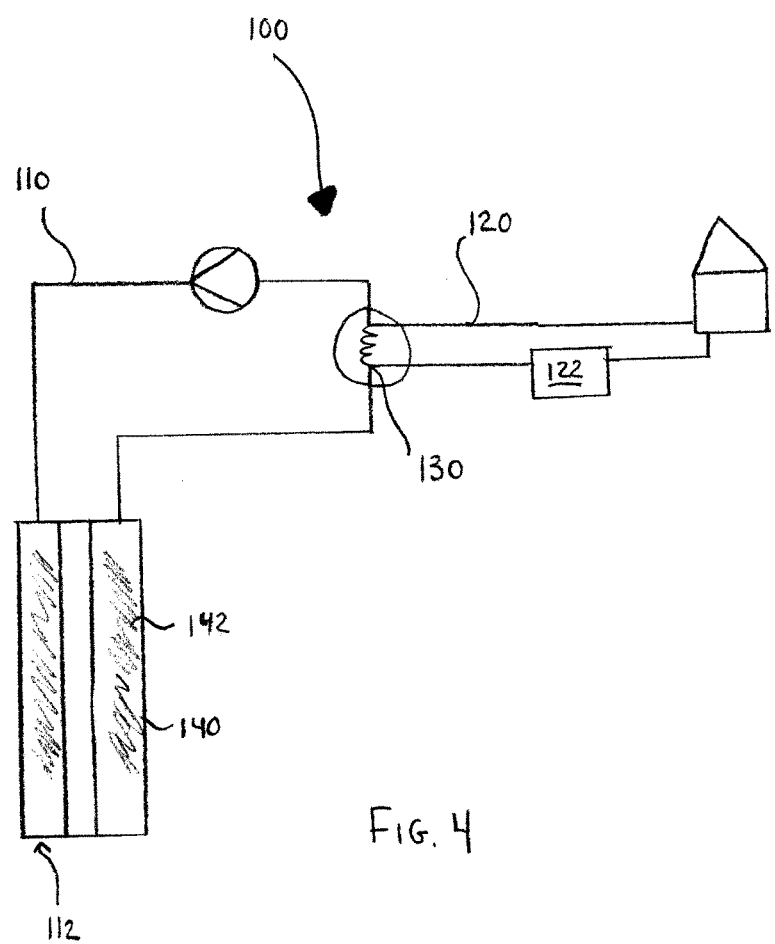
FIG. 4: a schematic drawing of a geothermal probe heat circuit.

FIG. 3 likewise shows a cross section through an inlet pipe 12. In the shown region, three mixing elements 20I, 20II, 20III are arranged within the annular space 15. The representation of the mixing elements 20I-III in the annular space 15 corresponds to the representation from FIG. 2. It is to be illustrated that the distance between the individual mixing elements 20I, 20II, 20III is selected in such a manner that a substantially laminarly flowing heat transfer fluid, indicated by large open arrows, always strikes the part ring surface 21 of the first part ring disc 22 of the respective mixing elements 20I, 20II, 20III. Furthermore it is noted that the first mixing element 20I brings about a rotatory movement of the heat transfer fluid about the outlet pipe 18 in anti-clockwise direction, while the mixing element 20II causes such in clockwise direction, and the mixing element 20III again conducts the heat transfer fluid about the outlet pipe 18 in anti-clockwise direction. Because of the multiple mixing elements 20I-III, a repeating change between laminar flow and intermixing of the heat transfer fluid takes place.

What is claimed is:

1. A geothermal probe for the exchange of heat between a ground surrounding the geothermal probe, in which the geothermal probe is arranged in the operating state, and a heat transfer fluid, comprising:
   1.1 an inlet pipe with an inlet pipe inner surface,
   1.2 an outlet pipe arranged therein with an outlet pipe outer surface, wherein between the inlet pipe inner surface and the outlet pipe outer surface an annular space is formed, into which the heat transfer fluid laminarly flows, and
   1.3 at least two mixing elements which are arranged spaced from one another in the annular space along a longitudinal axis of the outlet pipe,
      1.3.1 comprising at least one first part ring disc and one second part ring disc with a part ring surface each, which is delimited by an inner edge, which butts against the outlet pipe outer surface, an outer edge and two free ends, wherein
         1.3.1.1 the part ring discs are arranged differently obliquely to an orthogonal plane of the longitudinal axis of the outlet pipe, so that a first flow path with a rotatory component runs over the part ring surfaces about the outlet pipe,
         1.3.1.2 one each of the free ends of the first part ring disc and one of the free ends of the second part ring disc are arranged substantially spaced from one another and thus form an opening, through which a second flow path with a component that is parallel to the longitudinal axis of the outlet pipe leads, and
         1.3.1.3 the outer edge of the part ring discs with the inlet pipe inner surface forms an annular gap, through which a third flow path with a component along the inlet pipe inner surface lead,
         1.3.1.4 the first flow path intersects the second flow path and the third flow path and results in an intermixing of the heat transfer fluid,
   wherein the distance between the mixing elements is selected so that the heat transfer fluid following the intermixing by one of the mixing elements again flows almost laminarly to the next mixing element, such that a change between intermixing and almost laminar flow of the heat transfer fluid takes place in the geothermal probe.

2. The geothermal probe according to claim 1, wherein the meter volume of the annular space is greater than 8 l.

3. The geothermal probe according to claim 1, wherein the mixing elements are displaceably arranged in the annular space in a direction along the longitudinal axis (x-x).

4. The geothermal probe according to claim 3, wherein the mixing elements each comprise a sleeve with bores, which via grub screws can be arranged in different positions on the outlet pipe.

5. The geothermal probe according to claims 1, wherein the part ring discs of adjacent mixing elements are arranged differently in an orthogonal plane of the longitudinal axis in such a manner that the direction of the rotatory component of the first flow path of the adjacent mixing elements differs.

6. The geothermal probe according to claim 1, wherein the free ends of a part ring disc include among them an angle of 100° to 220°.

7. The geothermal probe according to claim 1, wherein the distance between the outer edge of the part ring discs and the inlet pipe inner surface in an orthogonal plane in radial direction to the longitudinal axis amounts to 1 mm to 2.5 mm.

8. A geothermal probe heat circuit, comprising
   a connection heat circuit with at least one geothermal probe according to claim 1,
   a consumer heat circuit with a heat pump for satisfying a heat request, and
   a heat exchanger for transferring heat between the connection heat circuit and the consumer heat circuit,
   and a circulating pipe for generating a circulation of the heat transfer fluid within the geothermal probe, which causes the heat transfer fluid to circulate at short time intervals independently of a heat request of the consumer heat circuit.

9. A method for operating a geothermal probe heat circuit with a geothermal probe according to claim 1, a circulating pump for generating a circulation of the heat transfer fluid within the geothermal probe, and a consumer heat circuit with a heat pump, wherein the circulating causes the heat transfer fluid to circulate at short time intervals independently of a heat request of the consumer heat circuit.

* * * * *